United States Patent [19]

Komatsu

[11] Patent Number: 5,439,856
[45] Date of Patent: Aug. 8, 1995

[54] HIGH THERMAL CONDUCTIVE SILICON NITRIDE SINTERED BODY AND METHOD OF PRODUCING THE SAME

[75] Inventor: Michiyasu Komatsu, Yokohama, Japan

[73] Assignee: Kabushiki Kaisha Toshiba, Kawasaki, Japan

[21] Appl. No.: 117,287

[22] Filed: Sep. 7, 1993

[30] Foreign Application Priority Data

Sep. 8, 1992 [JP] Japan ................... 4-239769

[51] Int. Cl.$^6$ ............................................. C04B 35/58
[52] U.S. Cl. ........................................ 501/97; 501/98; 501/152; 264/65
[58] Field of Search ............... 501/97, 98, 152; 264/65

[56] References Cited

U.S. PATENT DOCUMENTS

| | | | |
|---|---|---|---|
| 4,521,525 | 6/1985 | Hsieh | 501/97 |
| 4,904,624 | 2/1990 | Yeckley | 501/97 |
| 5,002,907 | 3/1991 | Hayakawa et al. | 501/98 |

FOREIGN PATENT DOCUMENTS 4-175268  6/1992  Japan .

*Primary Examiner*—Deborah Jones
*Attorney, Agent, or Firm*—Oblon, Spivak, McClelland, Maier, & Neustadt

[57] ABSTRACT

A high thermal conductive silicon nitride sintered body contains: 2.0-7.5% by weight of a rare earth element in terms of the amount of an oxide thereof; at most 0.3% by weight of Li, Na, K, Fe, Ca, Mg, Sr, Ba, Mn and B as impurity cationic elements in terms of total amount thereof; and, if necessary, at most 2.0% by weight of alumina and/or at most 2.0% by weight of aluminum nitride, and comprises a beta-phase type silicon nitride crystal and a grain boundary phase. The silicon nitride sintered body has a thermal conductivity of at least 60 W/m·K. Optionally, the sintered body further contains 0.2-3.0% by weight of at least one compound selected from the group consisting of the oxides, carbides, nitrides, silicides and borides of Ti, Zr, Hf, V, Nb, Ta, Cr, Mo and W. The sintered body has a porosity of at most 1.5% by volume, a thermal conductivity of at least 60 W/m·K, and a three-point bending strength of at least 80 kg/mm$^2$ at a room temperature. The sintered body achieves high thermal conductivity and good heat-radiating characteristics, as well as the high-strength characteristics generally inherent in silicon nitride sintered bodies.

22 Claims, No Drawings

HIGH THERMAL CONDUCTIVE SILICON NITRIDE SINTERED BODY AND METHOD OF PRODUCING THE SAME

BACKGROUND OF THE INVENTION

1. Field of the invention

The present invention relates to a high thermal conductive silicon nitride sintered body and a method of producing the same. More particularly, the invention relates to a high thermal conductive silicon nitride sintered body which achieves high thermal conductivity and good heat-radiating characteristics, as well as the high strength characteristics generally inherent in silicon nitride, so as to be suitable for semiconductor substrate, various types of radiator plates, etc., and a method of producing the high thermal conductive silicon nitride sintered body.

2. Description of the Related Art

Ceramic sintered bodies containing silicon nitride as a main component have strong heat resistance. They resist temperatures as high as 1000° C. or higher. Silicon nitride ceramic sintered bodies also have strong thermal shock resistance due to their low thermal expansivity. Because of these characteristics, silicon nitride ceramic sintered bodies are expected to be widely used as high-temperature structural materials, most of which are currently made of heat-resistant super alloys. In fact, silicon nitride ceramic sintered bodies are already used for high-strength heat-resistant components and parts of, for example, gas turbines, engines or steel making machines. Further, because of their high corrosion resistance to metal, some silicon nitride ceramic sintered bodies are applied to melt-resistant material for molten metal. Still further, because of their high abrasion resistance, some silicon nitride ceramic sintered bodies are applied to or tested for cutting tools or sliding parts such as bearings.

Various sintering compositions for silicon nitride ceramic sintered bodies are known, for example: silicon nitride-yttrium oxide-aluminum oxide system; silicon nitride-yttrium oxide-aluminum oxide-aluminium nitride system; and silicon nitride-yttrium oxide-aluminum oxide-oxide of titanium, magnesium or zirconium.

The oxides of rare earth elements, such as yttrium oxide ($Y_2O_3$) in the sintering compositions listed above, have been widely used as sintering assistant agents. Such rare earth element oxides enhance the sintering characteristics of sintering materials and, therefore, achieve high density and high strength of the sintered products (sintered bodies).

According to the conventional art, silicon nitride sintered bodies are generally mass-produced as follows. After a sintering assistant agent as mentioned above is added to the powder of silicon nitride, the mixture is molded to form a compact. Then, the compact is sintered in a sintering furnace at about 1600°–1850° C. for a predetermined period of time followed by cooling in the furnace.

However, though the silicon nitride sintered body produced by the conventional method achieves high mechanical strengths such as toughness, the thermal conductivities thereof are significantly lower than those of aluminum nitride (AlN) sintered bodies, beryllium oxide (BeO) sintered bodies or silicon carbide (SIC) sintered bodies. Therefore, conventional silicon nitride sintered bodies are unsuitable for electronic materials, such as semiconductor substrates, that need good heat-radiating characteristics. Accordingly, the use of silicon nitride sintered body is thus limited.

Aluminum nitride sintered bodies have high thermal conductivity and low thermal expansivity, compared with other ceramic sintered bodies. Aluminum nitride sintered bodies are widely used as packaging materials or materials of circuit base boards for semiconductor chips, which have been progressively improved in operational speed, output power, variety of functions and size. However, no conventional aluminum nitride sintered bodies achieve sufficiently high mechanical strengths.

Therefore, there is a growing need for a ceramic sintered body having both high thermal conductivity and high strength.

SUMMARY OF THE INVENTION

Accordingly, an object of the present invention is to provide a silicon nitride sintered body having a high thermal conductivity and, therefore, good heat-radiating characteristics, as well as the high strength characteristics generally inherent in silicon nitride sintered body, and a method of producing the silicon nitride sintered body.

To achieve the above object, the present inventor studied the effects of the types of silicon nitride powder, sintering assistant agent and additives, the amounts thereof used, and the sintering conditions on the characteristics of the final products, that is, the sintered bodies, by performing experiments.

The experiments provided the following findings.

A silicon nitride sintered body having both high strength and high thermal conductivity can be obtained by: adding certain amounts of a rare earth element and aluminum ingredients, such as aluminum nitride and alumina, to a highly-pure fine powder of silicon nitride; molding to form a compact and degreasing the compact; maintaining the compact at a predetermined high temperature for a certain period of time to sinter the compact so as to enhance the density thereof; and then gradually cooling the sintered body at a certain rate. In short, the above method significantly enhances the heat conductivity of a silicon nitride sintered body.

Further, formation of a glass phase (amorphous phase) in the grain boundary phase is effectively suppressed by using a highly pure powder of silicon nitride containing significantly reduced amounts of oxygen and impurity cationic elements, and preparing a silicon nitride molded compact having a reduced thickness before sintering. Thereby, a silicon nitride sintered body having a high thermal conductivity of 60 W/m·K or higher can be obtained even if only a rare earth element, but no aluminum ingredients, is added to a silicon nitride material powder.

Still further, a silicon nitride sintered body having a significantly enhanced thermal conductivity as well as high strength can be obtained by: adding certain amounts of a rare earth element and at least one compound selected from the group consisting of the oxides, carbides, nitrides, silicides and borides of Ti, Zr, Hf, V, Nb, Ta, Cr, Mo and W, and, if necessary, alumina and/or aluminum nitride, to a highly-pure fine powder material of silicon nitride; molding to form a compact and degreasing the compact; maintaining the compact at a predetermined high temperature for a certain period of time to sinter the compact so as to enhance the density thereof; and then gradually cooling the sintered body at a certain rate. Further, the grain boundary phase in the structure of a silicon nitride sintered body is changed from an amorphous phase to a phase including crystal phases by gradually cooling the sintered body at a rate of 100° C. per hour or lower while controlling the cooling rate, thereby achieving both high strength and high thermal conductivity. If a sintered body in a sintering furnace is cooled simply by switching off the furnace as performed according to the conventional method, the cooling rate is rather high, that is, about 400°–800° C. per hour.

The present invention has been achieved on the basis of the above findings. One aspect of the present invention provides a high thermal conductive silicon nitride sintered body containing: 2.0–7.5% by weight of a rare earth element in terms of the amount of an oxide thereof; and at most 0.3% by weight of Li, Na, K, Fe, Ca, Mg, Sr, Ba, Mn and B as impurity cationic elements, and having a thermal conductivity of at least 60 W/m·K.

Another aspect of the present invention provides a high thermal conductive silicon nitride sintered body containing: 2.0–7.5% by weight of a rare earth element in terms of the amount of an oxide thereof; at most 2.0% by weight of aluminum compound calculated as alumina; at most 0.3% by weight of Li, Na, K, Fe, Ca, Mg, Sr, Ba, Mn and B as impurity cationic elements in terms of total amount thereof, and comprising a silicon nitride crystal and a grain boundary phase.

The silicon nitride sintered body of the invention may contain at most 2.0% by weight of aluminum nitride, instead of the alumina. Further, the silicon nitride sintered body may contain at most 2.0% by weight of aluminum in terms of the amount of alumina, or at most 2.0% by weight of aluminum nitride there being at most 2% by weight of aluminum nitride and aluminum compound calculated as alumina as a tool amount there of.

A further aspect of the present invention provides a high thermal conductive silicon nitride sintered body containing: 2.0–7.5% by weight of a rare earth element in terms of the amount of an oxide thereof; 0.2–3.0% by weight of at least one compound selected from the group consisting of the oxides, carbides, nitrides, silicides and borides of Ti, Zr, Hf, V, Nb, Ta, Cr, Mo and W; at most 0.3% by weight of Li, Na, K, Fe, Ca, Mg, Sr, Ba, Mn and B as impurity cationic elements in terms of total amount thereof; and, if necessary, at most 2.0% by weight of aluminum in terms of the amount of alumina and/or at most 2.0% by weight of aluminum nitride, and comprising a silicon nitride crystal and a grain boundary phase.

It is preferred that the ratio of the area of a crystal compound phase formed in the grain boundary phase to the area of the grain boundary phase be at least 20%.

A still further aspect of the present invention provides a method of producing a high thermal conductive silicon nitride sintered body, comprising the steps of: forming a compact by molding a mixture obtained by adding 2.0–7.5% by weight of a rare earth element in terms of the amount of an oxide thereof, and at most 2.0% by weight of alumina and/or at most 2.0% by weight of aluminum nitride, to a silicon nitride powder which contains at most 1.7% by weight of oxygen, at most 0.3% by weight of Li, Na, K, Fe, Ca, Mg, Sr, Ba, Mn and B as impurity cationic elements in terms of total amount thereof, and at least 90% by weight of alpha-phase type silicon nitride, and which has an average grain size of at most 0.8 μm; degreasing the compact; sintering the compact at a temperature of 1800°–2000° C. while pressurizing the atmosphere around the compact to form a sintered body; and cooling the sintered body at a cooling rate of at most 100° C. per hour until the temperature is reduced to a point at which a liquid phase formed of the rare earth element during the sintering step solidifies.

A further aspect of the present invention provides a method of producing a high thermal conductive silicon nitride sintered body, comprising the steps of: forming a compact by molding a mixture obtained by adding 2.0–7.5% by weight of a rare earth element in terms of the amount of an oxide thereof, 0.2–3.0% by weight of at least one compound selected from the group consisting of the oxides, carbides, nitrides, silicides and borides of Ti, Zr, Hf, V, Nb, Ta, Cr, Mo and W, and, if necessary, 0.1–2.0% by weight of alumina and/or 0.1–2.0% by weight of aluminum nitride, to a silicon nitride powder which contains at most 1.7% by weight of oxygen, at most 0.3% by weight of Li, Na, K, Fe, Ca, Mg, Sr, Ba, Mn and B as impurity cationic elements in terms of total amount thereof, and at least 90% by weight of alpha-phase type silicon nitride, and which has an average grain size of at most 0.8 μm; degreasing the compact; sintering the compact at a temperature of 1800°–2000° C. while pressurizing the atmosphere around the compact; and cooling the sinter at a cooling rate of at most 100° C. per hour until the temperature is reduced to a point at which a liquid phase formed of the rare earth element during the sintering step solidifies.

The method of the present invention achieves a high thermal conductive silicon nitride sintered body having both good mechanical characteristics and good thermal conductive characteristics, more specifically, a porosity of at most 1.5% by volume, a thermal conductivity of at least 60 W/m·K, and a three-point bending strength of at least 80 kg/mm² at a room temperature.

To achieve good sintering characteristics, high strength and high thermal conductivity of the product, the silicon nitride powder which is used in the method of the invention and contained as a main component in the sintered body of the invention contains at most 1.7%, preferably, 0.5–1.5%, by weight of oxygen at most 0.3%, preferably, 0.2% or less, by weight of Li, Na, K, Fe, Ca, Mg, Sr, Ba, Mn and B as impurity cationic elements in terms of total amount thereof, and at least 90%, more preferably, 93% or more, by weight of alpha-phase type silicon nitride having good sintering characteristics, and, further the powder has fine grains, that is, an average grain size of at most 0.8 μm, more preferably, about 0.4–0.6 μm.

The use of a fine powder of silicon nitride having an average grain size of 0.8 μm or less facilitates forming a dense sintered body having a porosity of 1.5% or less without requiring a large amount of a sintering assistant agent, and therefore reduces the potential adverse effect of a sintering assistant agent on the thermal conductivity of the sintered body.

The total amount of the impurity cationic elements contained in the sintered body of the invention, that is, Li, Na, K, Fe, Ca, Mg, Sr, Ba, Mn and B, is limited to at most 0.3% by weight in order to ensure the sintered body a thermal conductivity of 60 W/m·K, because the impurity cationic elements adversely affect the thermal conductivity of the sintered body. The use of a silicon nitride powder containing at least 90% by weight of alpha-phase type silicon nitride, which has better sintering characteristics than a beta-phase type, facilitates producing a high-density sintered body.

Examples of the rare earth element to be contained as a sintering assistant agent in a silicon nitride powder are Y, La, Sc, Pr, Ce, Nd, Dy, Ho and Gd. Such a rare earth element may be contained in a silicon nitride powder in the form of an oxide thereof or a substance which is changed into an oxide thereof during the sintering process. One or more kinds of such oxide or substance may be contained in a silicon nitride powder. Among them, yttrium oxide ($Y_2O_3$) is particularly preferred. Such a sintering assistant agent reacts with the silicon nitride powder so as to form a liquid phase and thereby serves as a sintering promoter.

The amount of a sintering assistant agent to be contained in the silicon nitride powder (material powder) needs to be within a range of 2.0-7.5% by weight in terms of the amount of an oxide thereof. If the amount is less than 2.0% by weight, the sintered body fails to achieve a sufficiently high density and, therefore, the strength and thermal conductivity thereof are reduced to undesired levels. If the amount is more than 7.5% by weight, an excessively large portion of the grain boundary phase is formed, thereby reducing the thermal conductivity and strength of the sintered body. The more preferred range of the amount of a sintering assistant agent is 3.0-6.0% by weight.

Further, according to the present invent ion, alumina ($Al_2O_3$) assists the effect of a sintering promoter, that is, a rare earth element. Alumina provide a particularly great assisting effect if a pressurizing sintering process is employed. The amount of alumina to be contained in a silicon nitride powder is limited to at most 2.0% by weight because if the amount is greater than 2.0% by weight, an excessively large portion of the grain boundary phase is formed, or alumina starts dissolving into the silicon nitride and, therefore, reduces the thermal conductivity of the sintered body. Further, the amount of alumina contained is preferably within a range of 0.1-2.0% by weight because if it is less than 0.1% by weight, the sintered body fails to achieve a sufficiently high density. To achieve good characteristics of the sintered body besides the high strength and high thermal conductivity, the amount of alumina to be contained is preferably limited to a range of 0.2-1.5% by weight.

If alumina is used together with aluminum nitride (AlN) which is mentioned later, the total amount of the two compounds is preferably limited to at most 2.0% by weight.

Aluminum nitride plays various roles. For example, it suppresses the evaporation of silicon nitride and assists the sintering assistant effect of the rare earth element during the sintering process.

The amount of aluminum nitride is limited to at most 2.0% by weight because if it is greater than 2.0% by weight, an excessively large portion of the grain boundary phase is formed, or aluminum nitride starts dissolving into the silicon nitride and, therefore, reduces the thermal conductivity of the sinter. Further, the amount of aluminum nitride contained is preferably within a range of 0.3-2.0% by weight because if it is less than 0.3% by weight (or less than 0.1% by weight in the case where aluminum nitride is used together with alumina), the sintered body fails to achieve a sufficiently high density. To achieve good characteristics of the sinter besides the high strength and high thermal conductivity, the amount of aluminum nitride to be contained is preferably set to a range of 0.5-1.5% by weight. If aluminum nitride (AlN) is used together with alumina ($Al_2O_3$), the amount of the aluminum nitride contained in a silicon nitride powder is preferably set to a range of 0.1-2.0% by weight.

The oxides, carbides, nitrides, silicides and borides of Ti, Zr, Hf, V, Nb, Ta, Cr, Mo and W promotes the sintering assistant effect of a rare earth element, and promotes dispersion thereof in the crystal structure so as to enhance the mechanical strength of the silicon nitride ($Si_3N_4$) sintered body.

The amount of these compounds contained in a silicon nitride powder is set to a range of 0.2-3.0% by weight. If the amount of these compounds contained is less than 0.2% by weight, the sintered body fails to achieve a sufficiently high density. If the amount is greater than 3.0% by weight, the thermal conductivity, mechanical strength and electrical breakdown strength of the sintered body are reduced to undesired levels. The preferred range of the amount of these compounds contained is 0.3-2.0% by weight.

The above compounds, such as Ti, Zr and Hf, also serve as light blocking agents. More specifically, they stain or color the silicon nitride sintered body and thus provides it with an opacity. If the silicon nitride sintered body of the present invention is used for a base board for an integrated circuit or the like which tends to malfunction when exposed to light, an appropriate amount of one or more of the above compounds is preferably contained in the silicon nitride powder so as to enhance the light blocking characteristics of the silicon nitride sintered body.

Because aluminum compounds, such as aluminum nitride and alumina, assist the effect of a sintering assistant agent during the sintering process, the use of an aluminum compound relatively reduces the amount of the oxides, carbides, nitrides, silicides and borides of Ti, Zr, Hf, V, Nb, Ta, Cr, Mo and W needed in a silicon nitride powder. The amount of an aluminum compound, such as aluminum nitride or alumina, needed in a silicon nitride powder is closely related to the amount of the above-mentioned oxides and the like of Ti, Zr, Hf, V, Nb, Ta, Cr, Mo and W needed therein. If one or more of aluminum compounds, for example, alumina and/or aluminum nitride, are contained in a silicon nitride powder and the aluminum compound content is less than 0.1% by weight when the amount of a Ti compound or the like as indicated above is less than 0.2% by weight, the resulting sintered body fails to achieve a sufficiently high density. Further, if the aluminum compound content is greater than 2.0% by weight, an excessively large portion of the grain boundary phase is formed, or the aluminum compound starts dissolving into the silicon nitride and, therefore, reduces the thermal conductivity of the sintered body. Therefore, the aluminum compound content must be set to a range of 0.1-2.0% by weight. To achieve good characteristics of the sintered body besides the high strength and high thermal conductivity, the aluminum compound content is preferably within a range of 0.2-1.5% by weight.

The porosity of a sintered body significantly affects the thermal conductivity and strength of the sintered body. According to the present invention, the porosity is preferably set to 1.5% or less. If it is greater than 1.5%, the thermal conductivity and strength of the sintered body are reduced to undesired levels.

Further, the grain boundary phase formed in the silicon nitride crystal structure in a sintered body significantly affects the thermal conductivity of the sintered body. According to the present invention, the ratio of the area of a crystal phase formed in the grain boundary phase to the entire area of the grain boundary phase is preferably 20% or greater. If the ratio is less than 20%, the sintered body fails to achieve a thermal conductivity of at least 60 W/m·K and, therefore, good heat-radiating characteristics and a desirable high-temperature strength.

To ensure that the porosity of the silicon nitride sintered body is limited to at most 1.5% and the ratio of the area of a crystal phase formed in the grain boundary phase to the entire area of the grain boundary phase becomes at least 20%, a silicon nitride molded compact must be pressure-sintered at 1800°–2000° C. for about 0.5–10 hours immediately followed by cooling the sintered body at a rate of 100° C. per hour or slower.

If the sintering temperature is lower than 1800° C., the sintered body fails to achieve a sufficiently high density; more specifically, the porosity becomes greater than 1.5 vol %, thereby reducing both the mechanical strength and thermal conductivity of the sintered body to undesired levels. If the sintering temperature is higher than 2000° C., the silicon nitride per se becomes likely to evaporate or decompose. The decomposition and evaporation of the silicon nitride may occur at about 1800° C. if the sintering process is performed under the normal pressure.

The rate of cooling a sintered body must be carefully controlled in order to achieve crystallization of the grain boundary phase. If the cooling rate is faster than 100° C. per hour, the grain boundary phase of the structure of the sintered body becomes an amorphous phase (a glass phase) and, therefore, the ratio of the area of a crystal phase formed of the liquid phase formed during the sintering process to the entire area of the grain boundary phase becomes less than 20%. Thereby, the strength and thermal conductivity of the sintered body are reduced to undesired levels.

The sufficiently broad temperature range in which the cooling rate must be precisely controlled is from a predetermined sintering temperature (1800°–2000° C.) to the solidifying point of the liquid phase formed by the reaction of a sintering assistant agent as described above. The liquid phase solidifies at about 1600°–1500° C. if a sintering assistant agent is used. By maintaining the cooling rate at 100° C. per hour or slower, preferably, 50° C. per hour or slower, at least in a temperature range from the sintering temperature to the solidifying point of the liquid phase, most of the grain boundary phase becomes a crystal phase, thus achieving a sintered body having both high mechanical strength and high thermal conductivity.

A silicon nitride sintered body according to the present invention can be produced by, for example, the following processes. A material mixture is prepared by adding predetermined amount of a sintering assistant agent, a required additive, such as an organic binder, and alumina, aluminum nitride, and/or a compound of Ti, Zr, Hf or the like, to a fine powder of silicon nitride which has a predetermined average grain size and contains very small amounts of impurities. The material mixture is then molded into a compact having a predetermined shape by, for example, a conventional sheet molding method, such as the die-press method or the doctor-blade method. After the molding process, the molded compact is maintained at 600°–800° C. for 1–2 hours in a non-oxidizing atmosphere, thereby degreasing the compact, that is, thoroughly removing the organic binder added in the material mixture preparing process. The degreased compact is sintered at 1800°–2000° C. in an atmosphere of an inert gas, such as nitrogen gas or argon gas while being pressured by the atmosphere gas.

The silicon nitride sintered body thus produced achieves a porosity of 1.5% or less, a thermal conductivity of 60 W/m·K (25° C.) or greater, and a three-point bending strength of 80 kg/mm² or greater.

DESCRIPTION OF THE PREFERRED EMBODIMENTS

The present invention will be further described with reference to Examples and Comparative Examples.

[EXAMPLES 1–3]

5% by weight of yttrium oxide ($Y_2O_3$) powder, that is, a sintering assistant agent, having an average grain size of 0.7 μm, and 1.5% by weight of alumina ($Al_2O_3$) powder having an average grain size of 0.5 μm were added to a silicon nitride material powder having an average grain size of 0.55 μm. The silicon nitride material powder used in Examples 1–3 contained 1.3% by weight of oxygen and 0.15% by weight of impurity cationic elements with respect to the amount of the silicon nitride material powder, and the silicon nitride contained in the silicon nitride material powder contained 97% by weight of alpha-phase type silicon nitride with respect to the entire amount of the silicon nitride. The above-described mixture was wet-blended in ethyl alcohol for 24 hours and then dried to obtain a material mixture powder. A predetermined amount of an organic binder was added to the material mixture powder, and then homogeneously mixed. The mixture was then press-molded under a molding pressure of 1000 kg/cm² to obtain a plurality of molded compacts each having a size of 50 mm (length)×50 mm (width)×5 mm (thickness). After the compacts were degreased in the atmosphere gas at 700° C. for 2 hours, the compacts were sintered to enhance the density thereof, in the following manner. The degreased compacts were maintained at 1900° C. for 6 hours in a nitrogen gas atmosphere at 7.5 arm to form sintered bodies. While the sintered bodies were subsequently cooled, the cooling rates were determined at 100° C./hr (Example 1), 50° C./hr (Example 2) and 25° C./hr (Example 3) by controlling the power supplied to the heating devices provided in the sintering furnaces until the temperature inside the furnaces reached 1500° C. Silicon nitride ceramic sintered bodies of Examples 1–3 were thus prepared.

[COMPARATIVE EXAMPLE 1]

Silicon nitride sintered body of Comparative Example 1 was prepared in generally the same manner as in Example 1, except that after the sintering process, the heating device was powered off to cool the sintered body at a cooling rate of about 500° C./hr as performed by the conventional furnace cooling method.

COMPARATIVE EXAMPLE 2]

Silicon nitride sintered body of Comparative Example 2 was prepared in generally the same manner as in Example 1, except for using a silicon nitride material powder having an average grain size of 0.60 μm and containing 1.5% by weight of oxygen and 0.6% by weight of impurity cationic elements, the proportion of alpha-phase type silicon nitride to the entire amount of silicon nitride being 93% by weight, instead of the silicon nitride material powder used in Example 1.

[COMPARATIVE EXAMPLE 3]

Silicon nitride sintered body of Comparative Example 3 was prepared in generally the same manner as in Example 1, except for using a silicon nitride material powder having an average grain size of 1.1 μm and containing 1.7% by weight of oxygen and 0.7% by weight of impurity cationic elements, the proportion of alpha-phase type silicon nitride to the entire amount of silicon nitride being 91% by weight, instead of the silicon nitride material powder used in Example 1.

The silicon nitride sintered bodies of each of Examples 1–3 and Comparative Examples 1–3 were examined to determine their porosities, thermal conductivities, and three-point bending strengths at a room temperature. Further, X-ray analysis of each sintered body was performed to determine the proportion of the crystal phase to the grain boundary phase (area ratio). The obtained values were averaged respectively for Examples or Comparative Examples. The results are shown in Table 1.

TABLE 1

| Sintered Body | Cooling Rate until 1500° C. (°C./hr) | Porosity (%) | Crystal Phase Ratio (%) | Thermal Conductivity (W/m·K) | 3-Point Bending Strength (kg/mm$^2$) |
|---|---|---|---|---|---|
| Ex. 1 | 100 | 0.2 | 30 | 70 | 102 |
| Ex. 2 | 50 | 0.2 | 50 | 92 | 101 |
| Ex. 3 | 25 | 0.2 | 80 | 115 | 98 |
| C. Ex. 1 | 500 | 0.2 | 0 | 40 | 100 |
| C. Ex. 2 | 100 | 0.3 | 0 | 27 | 90 |
| C. Ex. 3 | 100 | 2.5 | 0 | 20 | 78 |

As indicated in Table 1, the silicon nitride sintered bodies of Examples 1–3, which were cooled at rates lower than the cooling rate in Comparative Example 1 immediately after the density-enhancing sintering process, had crystal phases formed in the grain boundary phases. A silicon nitride sintered body having a larger proportion of the crystal phase to the grain boundary phase achieved a greater thermal conductivity. The three-point bending strengths of the sintered bodies of Examples 1–3 were substantially the same despite their different crystal phase proportions. Thus, the sintered bodies of Examples 1–3 achieved both high strength and high thermal conductivity.

On the other hand, the sintered bodies of Comparative Example 1, which were cooled at a high rate of 500° C./hr, formed no crystal phase in the grain boundary phase, that is, the entire grain boundary phase was amorphous. The thermal conductivity of Comparative Example 1 was accordingly low. The sintered bodies of Comparative Example 2, which were formed of a silicon nitride material powder containing an increased amount of impurity cationic elements, that is, 6% by weight, formed no crystal phase in the grain boundary phase although the cooling rate was the same as in Example 1. The thermal conductivity of Comparative Example 2 was low. The sintered bodies of Comparative Example 3, which were formed of a silicon nitride powder having a larger average grain size, that is, 1.1 μm, had a large porosity indicating an insufficiently low density. As a result, the thermal conductivity and strength of Comparative Example 3 were low.

[EXAMPLES 4–12 AND COMPARATIVE EXAMPLES 4–7]

The material mixture powders of Examples 4–12 were prepared by varying the amounts of the same silicon nitride material powder, $Y_2O_3$ powder and $Al_2O_3$ powder as used in Example 1, as shown in Table 2. After the material mixture powders were molded to form compacts and degreased the compacts in generally the same manner as in Example 1, the degreased compacts were sintered under the conditions as shown in Table 2. The silicon nitride ceramic sintered bodies of Examples 4–12 were thus prepared.

The material mixture powders of Comparative Examples 4–7 were respectively prepared as indicated in Table 2. More specifically, the $Al_2O_3$ content was significantly reduced in Comparative Example 4. The $Y_2O_3$ content was significantly reduced in Comparative Example 5. The $Al_2O_3$ content was significantly increased in Comparative Example 6. The $Y_2O_3$ content was significantly increased in Comparative Example 7.

The material mixture powders were processed in generally the same manner as in Example 1, thus obtaining the silicon nitride sintered bodies of Comparative Examples 4–7.

The porosities, thermal conductivities, three-point bending strengths at a room temperature (25° C.) and crystal phase-to-grain boundary phase proportions (by X-ray analysis) of the sintered bodies of Examples 4–12 and Comparative Examples 4–7 were determined under the same conditions as in Example 1. The results are shown in Table 2.

TABLE 2

| Sintered Body | Composition (wt %) | | | Sintering Conditions Temp. × Time (°C.) (hr) | Cooling Rate until 1500° C. (°C./hr) |
|---|---|---|---|---|---|
| | $Si_3N_4$ | $Y_2O_3$ | $Al_2O_3$ | | |
| Ex. 4 | 94.5 | 5 | 0.5 | 1900 × 6 | 50 |
| Ex. 5 | 94 | 5 | 1 | 1900 × 6 | 50 |
| Ex. 6 | 93 | 5 | 2 | 1900 × 6 | 50 |
| Ex. 7 | 96 | 2 | 2 | 1900 × 6 | 50 |
| Ex. 8 | 92 | 7.5 | 0.3 | 1900 × 6 | 50 |
| Ex. 9 | 94 | 5 | 1 | 1900 × 6 | 100 |
| Ex. 10 | 94 | 5 | 1 | 1900 × 6 | 25 |
| Ex. 11 | 97 | 2 | 1 | 1950 × 6 | 50 |
| Ex. 12 | 94 | 5 | 1 | 1950 × 6 | 10 |
| C. Ex. 4 | 94.8 | 5 | 0.1 | 1900 × 6 | 100 |
| C. Ex. 5 | 97 | 1 | 2 | 1900 × 6 | 100 |
| C. Ex. 6 | 92 | 5 | 3 | 1900 × 6 | 100 |
| C. Ex. 7 | 89 | 10 | 1 | 1900 × 6 | 100 |

| Sintered Body | Porosity (%) | Crystal Phase Ratio (%) | Thermal Conductivity (W/m·K) | 3-Point Bending Strength (kg/mm$^2$) |
|---|---|---|---|---|
| Example 4 | 0.4 | 55 | 85 | 94 |
| Example 5 | 0.3 | 50 | 88 | 97 |
| Example 6 | 0.2 | 45 | 90 | 102 |
| Example 7 | 0.9 | 25 | 62 | 90 |
| Example 8 | 0.3 | 92 | 120 | 101 |
| Example 9 | 0.2 | 42 | 80 | 100 |
| Example 10 | 0.2 | 90 | 120 | 97 |
| Example 11 | 1.2 | 45 | 81 | 95 |
| Example 12 | 0.1 | 95 | 128 | 96 |
| Comp. Ex. 4 | 2.5 | 50 | 51 | 80 |
| Comp. Ex. 5 | 3.0 | 15 | 35 | 72 |
| Comp. Ex. 6 | 0.1 | 10 | 40 | 105 |
| Comp. Ex. 7 | 0.1 | 38 | 50 | 85 |

As shown in Table 2, the sintered bodies of Examples 4–12, which contained amounts of $Y_2O_3$ and $Al_2O_3$ within the ranges according to the present invention, and which were cooled at predetermined cooling rates according to the present invention, achieved sufficiently high strengths and thermal conductivities. On the other hand, the sintered bodies of Comparative Examples 4-7, in each of which the $Y_2O_3$ content and/or the $Al_2O_3$ content was out of the respective ranges determined according to the present invention, failed to achieve a sufficiently high density or a sufficiently high crystal phase-to-grain boundary phase proportion (in a case, an excessively large grain boundary phase was formed). Therefore, the bending strength or the thermal conductivity thereof was undesirably reduced.

[EXAMPLES 13-16]

Silicon nitride ceramic sintered bodies of Example 13-16 were prepared in generally the same manner as in Example 1, except that the oxides of rare earth elements as shown in Table 3 were used instead of the $Y_2O_3$ powder.

The porosities, thermal conductivities, three-point bending strengths at a room temperature (25° C.) and crystal phase-to-grain boundary phase proportions (by X-ray analysis) of the sintered bodies of Examples 13-16 were determined under the same conditions as in Example 1. The results are shown in Table 3.

TABLE 3

| Sintered Body | Oxide of Rare Earth Element | Porosity (%) | Crystal Phase Ratio (%) | Thermal Conductivity (W/m · K) | 3-Point Bending Strength (kg/mm$^2$) |
| --- | --- | --- | --- | --- | --- |
| Ex. 13 | CeO$_2$ | 0.1 | 50 | 88 | 98 |
| Ex. 14 | Nd$_2$O$_3$ | 0.2 | 55 | 90 | 95 |
| Ex. 15 | Yb$_2$O$_3$ | 0.2 | 65 | 100 | 102 |
| Ex. 16 | Dy$_2$O$_3$ | 0.1 | 55 | 98 | 100 |

As shown in Table 3, the sintered bodies of Examples 13-16 employing rare earth element oxides other than $Y_2O_3$ achieved generally the same properties as those of the sintered bodies employing $Y_2O_3$.

Sintered bodies employing aluminum nitride (AlN) will be described below.

[EXAMPLES 17-19]

5% by weight of yttrium oxide ($Y_2O_3$) powder, that is, a sintering assistant agent, having an average grain size of 0.7 μm, and 1% by weight of aluminum nitride (AlN) powder having an average grain size of 0.8 μm were added to a silicon nitride material powder having an average grain size of 0.55 μm. The silicon nitride material powder used in Examples 17-19 contained 1.3% by weight of oxygen and 0.15% by weight of impurity cationic elements with respect to the amount of the silicon nitride material powder, and the silicon nitride contained in the silicon nitride material powder contained 97% by weight of alpha-phase type silicon nitride with respect to the entire amount of the silicon nitride. The above-described mixture was wet-blended in ethyl alcohol for 24 hours and then dried to obtain a material mixture powder. A predetermined amount of an organic binder was added to the material mixture powder, and then homogeneously mixed. The mixture was then press-molded under a molding pressure of 1000 kg/cm$^2$ to obtain a plurality of compacts each having a size of 50 mm (length)×50 mm (width)×5 mm (thickness). After the compacts were degreased in the atmosphere gas at 700° C. for 2 hours, the compacts were sintered to enhance the density thereof, in the following manner. The degreased compacts were maintained at 1900° C. for 6 hours in a nitrogen gas atmosphere at 7.5 atm to form sintered bodies. While the sintered bodies were subsequently cooled, the cooling rates were determined at 100° C./hr (Example 17), 50° C./hr (Example 18) and 25° C./hr (Example 19) by controlling the power supplied to the heating devices provided in the sintering furnaces until the temperature inside the furnaces reached 1500° C. Silicon nitride ceramic sintered bodies of Examples 17-19 were thus prepared.

[COMPARATIVE EXAMPLE 8]

Silicon nitride sintered body of Comparative Example 8 were prepared in generally the same manner as in Example 17, except that after the sintering process, the heating device was powered off to cool the sintered body at a cooling rate of about 500° C./hr as performed by the conventional furnace cooling method.

[COMPARATIVE EXAMPLE 9]

Silicon nitride sintered bodies of Comparative Example 9 were prepared in generally the same manner as in Example 17, except for using a silicon nitride material powder having an average grain size of 0.60 μm and containing 1.5% by weight of oxygen and 0.6% by weight of impurity cationic elements, the proportion of alpha-phase type silicon nitride to the entire amount of silicon nitride being 93% by weight, instead of the silicon nitride material powder used in Example 17.

[COMPARATIVE EXAMPLE 10]

Silicon nitride sintered bodies of Comparative Example 10 were prepared in generally the same manner as in Example 17, except for using a silicon nitride material powder having an average grain size of 1.1 μm and containing 1.7% by weight of oxygen and 0.7% by weight of impurity cationic elements, the proportion of alpha-phase type silicon nitride to the entire amount of silicon nitride being 91% by weight, instead of the silicon nitride material powder used in Example 17.

The silicon nitride sintered bodies of each of Examples 17-19 and Comparative Examples 8-10 were examined to determine their porosities, thermal conductivities, and three-point bending strengths at a room temperature. Further, X-ray analysis of each sintered body was performed to determine the proportion of the crystal phase to the grain boundary phase (area ratio). The obtained values were averaged respectively for Examples or Comparative Examples. The results are shown in Table 4.

TABLE 4

| Sintered Body | Cooling Rate until 1500° C. (°C./hr) | Porosity (%) | Crystal Phase Ratio (%) | Thermal Conductivity (W/m · K) | 3-Point Bending Strength (kg/mm$^2$) |
| --- | --- | --- | --- | --- | --- |
| Ex. 17 | 100 | 0.3 | 35 | 72 | 100 |
| Ex. 18 | 50 | 0.3 | 55 | 95 | 98 |
| Ex. 19 | 25 | 0.2 | 85 | 117 | 93 |
| C. Ex. 8 | 500 | 0.3 | 0 | 48 | 95 |
| C. Ex. 9 | 100 | 0.3 | 0 | 30 | 90 |
| C. Ex. 10 | 100 | 2.8 | 0 | 23 | 70 |

As indicated in Table 4, the silicon nitride sintered bodies of Examples 17-19, which were cooled at rates lower than the cooling rate in Comparative Example 8 immediately after the density-enhancing sintering process, had crystal phases formed in the grain boundary phases. A silicon nitride sintered body having a larger crystal phase-to-grain boundary phase portion achieved a greater thermal conductivity. The three-point bending strengths of the sintered bodies of Examples 17–19 were substantially the same despite their different crystal phase proportions. Thus, the sintered bodies of Examples 17–19 achieved both high strength and high thermal conductivity.

On the other hand, the sintered bodies of Comparative Example 8, which were cooled at a high rate of 500° C./hr, formed no crystal phase in the grain boundary phase, that is, the entire grain boundary phase was amorphous. The thermal conductivity of Comparative Example 8 was accordingly low. The sintered bodies of Comparative Example 9, which were formed of a silicon nitride material powder containing an increased amount of impurity cationic elements, that is, 6% by weight, formed no crystal phase in the grain boundary phase although the cooling rate was the same as in Example 17. The thermal conductivity of Comparative Example 9 was low. The sintered bodies of Comparative Example 10, which were formed of a silicon nitride powder having a larger average grain size, that is, 1.1 μm, had a large porosity indicating an insufficiently low density. As a result, the thermal conductivity and strength of Comparative Example 10 were low.

[EXAMPLES 20–31 and COMPARATIVE EXAMPLES 11–13]

The material mixture powders of Examples 20–31 were prepared by varying the amounts of an $Al_2O_3$ powder having an average grain size of 0.5 μm and the same silicon nitride material powder, $Y_2O_3$ powder and AlN powder as used in Example 17, as shown in Table 5. After the material mixture powders were molded to form compacts and degreased the compacts in generally the same manner as in Example 17, the degreased compacts were sintered under the conditions as shown in Table 5. The silicon nitride ceramic sintered bodies of Examples 20–31 were thus prepared.

The material mixture powders of Comparative Examples 11–13 were respectively prepared as indicated in Table 5. More specifically, the $Y_2O_3$ content was significantly reduced in Comparative Example 11. The AlN content was significantly increased in Comparative Example 12. The $Y_2O_3$ content was significantly increased in Comparative Example 13. The material mixture powders were processed in generally the same manner as in Example 17, thus obtaining the silicon nitride sintered bodies of Comparative Examples 11–13.

The porosities, thermal conductivities, three-point bending strengths at a room temperature (25° C.) and crystal phase-to-grain boundary phase proportions (by X-ray analysis) of the sintered bodies of Examples (Ex.) 20–31 and Comparative Examples (C.Ex.) 11–13 were determined under the same conditions as in Example 17. The results are shown in Table 5.

TABLE 5

| Sintered Body | Composition (wt %) | | | | Sintering Conditions Temp. × Time (°C.) (hr) | Cooling Rate until 1500° C. (°C./hr) |
|---|---|---|---|---|---|---|
| | $Si_3N_4$ | $Y_2O_3$ | AlN | $Al_2O_3$ | | |
| Ex. 20 | 94.7 | 5 | 0.3 | | 1900 × 6 | 50 |
| Ex. 21 | 94 | 5 | 1 | | 1900 × 6 | 50 |
| Ex. 22 | 93 | 5 | 2 | | 1900 × 6 | 50 |
| Ex. 23 | 96 | 2 | 2 | | 1900 × 6 | 50 |
| Ex. 24 | 92.2 | 7.5 | 0.3 | | 1900 × 6 | 50 |
| Ex. 25 | 94 | 5 | 1 | | 1900 × 6 | 100 |
| Ex. 26 | 94 | 5 | 1 | | 1900 × 6 | 25 |
| Ex. 27 | 97 | 2 | 1 | | 1950 × 6 | 50 |
| Ex. 28 | 94 | 5 | 1 | | 1950 × 6 | 10 |
| Ex. 29 | 94 | 5 | 0.5 | 0.1 | 1900 × 6 | 100 |
| Ex. 30 | 93.8 | 5 | 1 | 0.2 | 1900 × 6 | 100 |
| Ex. 31 | 93.7 | 5 | 0.3 | 1 | 1900 × 6 | 100 |
| C. Ex. 11 | 97 | 1 | 2 | | 1900 × 6 | 100 |
| C. Ex. 12 | 92 | 5 | 3 | | 1900 × 6 | 100 |
| C. Ex. 13 | 92 | 10 | 1 | | 1900 × 6 | 100 |

| Sintered Body | Porosity (%) | Crystal Phase Ratio (%) | Thermal Conductivity (W/m·K) | 3-Point Bending Strength (kg/mm²) |
|---|---|---|---|---|
| Example 20 | 0.8 | 48 | 80 | 84 |
| Example 21 | 0.4 | 50 | 85 | 95 |
| Example 22 | 0.2 | 40 | 80 | 100 |
| Example 23 | 1.0 | 30 | 75 | 92 |
| Example 24 | 0.5 | 60 | 95 | 98 |
| Example 25 | 0.2 | 45 | 80 | 100 |
| Example 26 | 0.2 | 80 | 115 | 96 |
| Example 27 | 1.3 | 40 | 85 | 90 |
| Example 28 | 0.2 | 95 | 120 | 95 |
| Example 29 | 0.2 | 50 | 85 | 105 |
| Example 30 | 0.2 | 48 | 83 | 108 |
| Example 31 | 0.2 | 45 | 81 | 107 |
| Comp. Ex. 11 | 3.2 | 20 | 38 | 70 |
| Comp. Ex. 12 | 0.1 | 15 | 50 | 100 |
| Comp. Ex. 13 | 0.1 | 30 | 55 | 86 |

As shown in Table 5, the sintered bodies of Examples 20–31, which contained amounts of $Y_2O_3$ and AlN and, optionally, $Al_2O_3$ within the ranges according to the present invention, and which were cooled at predetermined cooling rates according to the present invention, achieved sufficiently high strengths and thermal conductivities. On the other hand, the sintered bodies of Comparative Examples 11–13, in each of which the $Y_2O_3$ content and/or the AlN content was out of the respective ranges determined according to the present invention, failed to achieve a sufficiently high density or a sufficiently high crystal phase-to-grain boundary phase proportion (in a case, an excessively large grain boundary phase was formed). Therefore, the bending strength or the thermal conductivity thereof was undesirably reduced.

[EXAMPLES 32–35]

Silicon nitride ceramic sintered bodies of Example 32–35 were prepared in generally the same manner as in Example 17, except that the oxides of rare earth elements as shown in Table 6 were used instead of the $Y_2O_3$ powder. The porosities, thermal conductivities, three-point bending strengths at a room temperature (25° C.) and crystal phase-to-grain boundary phase proportions (by X-ray analysis) of the sintered bodies of Examples 32–35 were determined under the same conditions as in Example 17. The results are shown in Table 6.

TABLE 6

| Sintered Body | Oxide of Rare Earth Element | Porosity (%) | Crystal Phase Ratio (%) | Thermal Conductivity (W/m·K) | 3-Point Bending Strength (kg/mm²) |
|---|---|---|---|---|---|
| Ex. 32 | $CeO_2$ | 0.2 | 55 | 89 | 95 |
| Ex. 33 | $Nd_2O_3$ | 0.3 | 55 | 88 | 98 |
| Ex. 34 | $Yb_2O_3$ | 0.3 | 65 | 103 | 95 |
| Ex. 35 | $Dy_2O_3$ | 0.2 | 60 | 99 | 101 |

As shown in Table 6, the sintered bodies of Examples 32–35 employing rare earth element oxides other than Y₂O₃ achieved generally the same properties as those of the sintered bodies employing Y₂O₃.

[EXAMPLES 36-38]

5% by weight of yttrium oxide (Y₂O₃) powder, that is, a sintering assistant agent, having an average grain size of 0.7 μm, and 1.5% by weight of hafnium oxide (HfO₂) powder having an average grain size of 1 μm were added to a silicon nitride material powder having an average grain size of 0.55 μm.

The silicon nitride material powder used in Examples 36-38 contained 1.3% by weight of oxygen and 0.15% by weight of impurity cationic elements with respect to the amount of the silicon nitride material powder, and the silicon nitride contained in the silicon nitride material powder contained 97% by weight of alpha-phase type silicon nitride with respect to the entire amount of the silicon nitride. The above-described mixture was wet-blended in ethyl alcohol for 24 hours and then dried to obtain a material mixture powder. A predetermined amount of an organic binder was added to the material mixture powder, and then homogeneously mixed. The mixture was then press-molded under a molding pressure of 1000 kg/cm² to obtain a plurality of molded compacts each having a size of 50 mm (length)×50 mm (width)×5 mm (thickness). After the compacts were degreased in the atmosphere gas at 700° C. for 2 hours, the compacts were sintered to enhance the density thereof, in the following manner. The degreased compacts were maintained at 1900° C. for 6 hours in a nitrogen gas atmosphere at 7.5 arm to form sintered bodies. While the sintered bodies were subsequently cooled, the cooling rates were determined at 100° C./hr (Example 36), 50° C./hr (Example 37) and 25° C./hr (Example 38) by controlling the power supplied to the heating devices provided in the sintering furnaces until the temperature inside the furnaces reached 1500° C. Silicon nitride ceramic sintered bodies of Examples 36-38 were thus prepared.

[COMPARATIVE EXAMPLE 14]

Silicon nitride sintered bodies of Comparative Example 14 were prepared in generally the same manner as in Example 36, except that after the sintering process, the heating device was powered off to cool the sintered body at a cooling rate of about 500° C./hr as performed by the conventional furnace cooling method.

[COMPARATIVE EXAMPLE 15]

Silicon nitride sintered bodies of Comparative Example 15 were prepared in generally the same manner as in Example 36, except for using a silicon nitride material powder having an average grain size of 0.60 μm and containing 1.5% by weight of oxygen and 0.6% by weight of impurity cationic elements, the proportion of alpha-phase type silicon nitride to the entire amount of silicon nitride being 93% by weight, instead of the silicon nitride material powder used in Example 36.

[COMPARATIVE EXAMPLE 16]

Silicon nitride sintered bodies of Comparative Example 16 were prepared in generally the same manner as in Example 36, except for using a silicon nitride material powder having an average grain size of 1.1 μm and containing 1.7% by weight of oxygen and 0.7% by weight of impurity cationic elements, the proportion of alpha-phase type silicon nitride to the entire amount of silicon nitride being 91% by weight, instead of the silicon nitride material powder used in Example 36.

The silicon nitride sintered bodies of each of Examples 36-38 and Comparative Examples 14-16 were examined to determine their porosities, thermal conductivities, and three-point bending strengths at a room temperature. Further, X-ray analysis of each sintered body was performed to determine the proportion of the crystal phase to the grain boundary phase (area ratio). The obtained values were averaged respectively for Examples or Comparative Examples. The results are shown in Table 7.

TABLE 7

| Sintered Body | Cooling Rate until 1500° C. (°C./hr) | Porosity (%) | Crystal Phase Ratio (%) | Thermal Conductivity (W/m·K) | 3-Point Bending Strength (kg/mm²) |
|---|---|---|---|---|---|
| Ex. 36 | 100 | 0.4 | 50 | 89 | 100 |
| Ex. 37 | 50 | 0.4 | 70 | 98 | 100 |
| Ex. 38 | 25 | 0.3 | 87 | 105 | 98 |
| C. Ex. 14 | 500 | 0.4 | 0 | 48 | 95 |
| C. Ex. 15 | 100 | 0.3 | 0 | 35 | 90 |
| C. Ex. 16 | 100 | 3.0 | 0 | 22 | 70 |

As indicated in Table 7, the silicon nitride sintered bodies of Examples 36-38, which were cooled at rates lower than the cooling rate in Comparative Example 14 immediately after the density-enhancing sintering process, had crystal phases formed in the grain boundary phases. A silicon nitride sintered body having a larger crystal phase-to-grain boundary phase proportion achieved a greater thermal conductivity. The three-point bending strengths of the sintered bodies of Examples 36-38 were substantially the same despite their different crystal phase proportions. Thus, the sintered bodies of Examples 36-38 achieved both high strength and high thermal conductivity.

On the other hand, the sintered bodies of Comparative Example 14, which were cooled at a high rate of 500° C./hr, formed no crystal phase in the grain boundary phase, that is, the entire grain boundary phase was amorphous. The thermal conductivity of Comparative Example 14 was accordingly low. The sintered bodies of Comparative Example 15, which were formed of a silicon nitride material powder containing an increased amount of impurity cationic elements, that is, 6% by weight, formed no crystal phase in the grain boundary phase although the cooling rate was the same as in Example 36. The thermal conductivity thereof was low. The sintered bodies of Comparative Example 16, which were formed of a silicon nitride powder having a larger average grain size, that is, 1.1 μm, had a large porosity indicating an insufficiently low density. As a result, the thermal conductivity and strength of Comparative Example 16 were low.

[EXAMPLES 39-69 AND COMPARATIVE EXAMPLES 17-23]

The material mixture powders of Examples 39-69 were prepared by varying the amounts of the same silicon nitride material powder, Y₂O₃ powder and HfO₂ powder as used in Example 36 or other metal compound powders and, optionally, Al₂O₃ powder and/or AlN powder, as shown in Tables 8 and 9. After the material mixture powders were molded to form compacts and degreased the compacts in generally the same manner as in Example 36, the degreased compacts were sintered under the conditions as shown in Tables 8, 9 to form sintered bodies. The silicon nitride ceramic sintered bodies of Examples 39–69 were thus prepared.

The material mixture powders of Comparative Examples 17–23 were respectively prepared as indicated in Table 9. More specifically, a significantly reduced amount of HfO$_2$ was used in Comparative Example 17. A significantly reduced amount of Y$_2$O$_3$ was used in Comparative Example 18. A significantly increased amount of HfO$_2$ was used in Comparative Example 19. A significantly increased amount of Y$_2$O$_3$ was used in Comparative Example 20. A significantly increased amount of TiO$_2$ was used in Comparative Example 21. A significantly increased amount of AlN was used in Comparative Example 22. A significantly increased amount of alumina was used in Comparative Example 23. The material mixture powders were processed in generally the same manner as in Example 36, thus obtaining the silicon nitride sintered bodies of Comparative Examples 17–23.

The porosities, thermal conductivities, three-point bending strengths at a room temperature (25° C.) and crystal phase-to-grain boundary phase proportions (by X-ray analysis) of the sintered bodies of Examples 39–69 and Comparative Examples 17–23 were determined under the same conditions as in Example 36.

The results are shown in Tables 8, 9.

TABLE 8

| Sintered Body | Composition (wt %) | | | | | Sintering Conditions Temp. × Time (°C.) (hr) | Cooling Rate until 1500° C. (°C./hr) | Porosity (%) | Crystal Phase Ratio (%) | Thermal Conductivity (W/m · K) | 3-Point Bending Strength (kg/mm$^2$) |
| --- | --- | --- | --- | --- | --- | --- | --- | --- | --- | --- | --- |
| | Si$_3$N$_4$ | Y$_2$O$_3$ | Other Component | | Al$_2$O$_3$ | AlN | | | | | | |
| Ex. 39 | 94.8 | 5 | HfO$_2$ | 0.2 | | | 1900 × 6 | 50 | 1.3 | 50 | 88 | 85 |
| Ex. 40 | 94 | 5 | HfO$_2$ | 1 | | | 1900 × 6 | 50 | 0.2 | 55 | 90 | 98 |
| Ex. 41 | 92 | 5 | HfO$_2$ | 3 | | | 1900 × 6 | 50 | 0.1 | 45 | 75 | 108 |
| Ex. 42 | 95 | 2 | HfO$_2$ | 3 | | | 1900 × 6 | 50 | 0.5 | 30 | 65 | 95 |
| Ex. 43 | 92 | 7.5 | HfO$_2$ | 0.5 | | | 1900 × 6 | 50 | 0.1 | 75 | 95 | 88 |
| Ex. 44 | 94 | 5 | HfO$_2$ | 1 | | | 1900 × 6 | 100 | 0.2 | 45 | 80 | 100 |
| Ex. 45 | 94 | 5 | HfC | 1 | | | 1900 × 6 | 100 | 0.3 | 55 | 92 | 98 |
| Ex. 46 | 94 | 5 | HfN | 1 | | | 1900 × 6 | 100 | 0.4 | 55 | 90 | 95 |
| Ex. 47 | 94 | 5 | HfSi$_2$ | 1 | | | 1900 × 6 | 100 | 0.4 | 50 | 88 | 93 |
| Ex. 48 | 94 | 5 | HfB$_2$ | 1 | | | 1900 × 6 | 100 | 0.4 | 45 | 83 | 90 |
| Ex. 49 | 94 | 5 | TiO$_2$ | 1 | | | 1900 × 6 | 100 | 0.2 | 48 | 80 | 98 |
| Ex. 50 | 95 | 5 | ZrO$_2$ | 1 | | | 1900 × 6 | 100 | 0.2 | 45 | 85 | 105 |
| Ex. 51 | 94 | 5 | V$_2$O$_5$ | 1 | | | 1900 × 6 | 100 | 0.3 | 50 | 90 | 95 |
| Ex. 52 | 94 | 5 | Nb$_2$O$_5$ | 1 | | | 1900 × 6 | 100 | 0.2 | 48 | 83 | 90 |
| Ex. 53 | 94 | 5 | Ta$_2$O$_5$ | 1 | | | 1900 × 6 | 100 | 0.4 | 45 | 80 | 92 |
| Ex. 54 | 94 | 5 | Cr$_2$O$_3$ | 1 | | | 1900 × 6 | 100 | 0.2 | 58 | 100 | 95 |
| Ex. 55 | 94 | 5 | MoO$_3$ | 1 | | | 1900 × 6 | 100 | 0.4 | 40 | 75 | 93 |
| Ex. 56 | 94 | 5 | WO$_3$ | 1 | | | 1900 × 6 | 100 | 0.3 | 40 | 75 | 90 |
| Ex. 57 | 94 | 5 | TiC | 1 | | | 1900 × 6 | 100 | 0.4 | 59 | 95 | 95 |
| Ex. 58 | 94 | 5 | WC | 1 | | | 1900 × 6 | 100 | 0.3 | 49 | 83 | 93 |
| Ex. 59 | 94 | 5 | TiB$_2$ | 1 | | | 1900 × 6 | 100 | 0.4 | 40 | 80 | 97 |
| Ex. 60 | 94 | 5 | HfO$_2$ TiO$_2$ | 0.5 0.5 | | | 1900 × 6 | 100 | 0.2 | 46 | 82 | 102 |

TABLE 9

| Sintered Body | Composition (wt %) | | | | | | Sintering Conditions Temp. × Time (°C.) (hr) | Cooling Rate until 1500° C. (°C./hr) | Porosity (%) | Crystal Phase Ratio (%) | Thermal Conductivity (W/m · K) | 3-Point Bending Strength (kg/mm$^2$) |
| --- | --- | --- | --- | --- | --- | --- | --- | --- | --- | --- | --- | --- |
| | Si$_3$N$_4$ | Y$_2$O$_3$ | Other Component | | Al$_2$O$_3$ | AlN | | | | | | | |
| Ex. 61 | 94 | 5 | ZrO$_2$ Cr$_2$O$_3$ | 0.5 0.5 | | | 1900 × 6 | 100 | 0.2 | 52 | 84 | 98 |
| Ex. 62 | 94 | 5 | TiC HfO$_2$ | 0.5 0.5 | | | 1900 × 6 | 100 | 0.2 | 50 | 90 | 100 |
| Ex. 63 | 94.4 | 5 | HfO$_2$ | 0.5 | 0.1 | | 1900 × 6 | 100 | 0.3 | 50 | 85 | 98 |
| Ex. 64 | 92.8 | 5 | TiC | 0.2 | 2 | | 1900 × 6 | 100 | 0.2 | 30 | 70 | 100 |
| Ex. 65 | 94 | 5 | HfO$_2$ | 0.5 | | 0.5 | 1900 × 6 | 100 | 0.1 | 58 | 90 | 99 |
| Ex. 66 | 92.8 | 5 | HfO$_2$ | 0.2 | | 2 | 1900 × 6 | 100 | 0.2 | 40 | 75 | 90 |
| Ex. 67 | 94.1 | 5 | HfO$_2$ | 0.5 | 0.1 | 0.3 | 1900 × 6 | 100 | 0.2 | 60 | 98 | 102 |
| Ex. 68 | 92.8 | 5 | Cr$_2$O$_3$ | 0.2 | 1 | 1 | 1900 × 6 | 100 | 0.2 | 40 | 68 | 105 |
| Ex. 69 | 92.8 | 5 | TiO$_2$ | 2 | 0.1 | 0.1 | 1900 × 6 | 100 | 0.2 | 45 | 76 | 100 |
| C. Ex. 17 | 95.9 | 5 | HfO$_2$ | 0.1 | | | 1900 × 6 | 100 | 2.6 | 55 | 60 | 78 |
| C. Ex. 18 | 97 | 1 | HfO$_2$ | 2 | | | 1900 × 6 | 100 | 5.5 | 20 | 25 | 68 |
| C. Ex. 19 | 90 | 5 | HfO$_2$ | 5 | | | 1900 × 6 | 100 | 0.1 | 18 | 50 | 88 |
| C. Ex. 20 | 89.5 | 10 | HfO$_2$ | 0.5 | | | 1900 × 6 | 100 | 0.2 | 20 | 52 | 85 |
| C. Ex. 21 | 90 | 5 | TiO$_2$ | 5 | | | 1900 × 6 | 100 | 0.1 | 15 | 48 | 90 |
| C. Ex. 22 | 91.5 | 5 | HfO$_2$ | 0.5 | | 3 | 1900 × 6 | 100 | 0.2 | 14 | 50 | 80 |
| C. Ex. 23 | 91.9 | 5 | TiO$_2$ | 0.2 | 3 | | 1900 × 6 | 100 | 0.2 | 5 | 40 | 98 |

As shown in Tables 8 and 9, the sintered bodies of Examples 39–69, which contained amounts of metal compounds, such as Y$_2$O$_3$ and HfO$_2$, and, optionally, Al$_2$O$_3$ and/or AlN within the ranges according to the present invention, and which were cooled at predetermined cooling rates according to the present invention, achieved sufficiently high strengths and thermal conductivities. On the other hand, the sintered bodies of Comparative Examples 17–23, each of which contained an excessively reduced or increased amount of at least one of Y$_2$O$_3$, HfO$_2$, TiO$_2$, Al$_2$O$_3$ and AlN, that is, an amount out of the respective ranges determined according to the present invention, failed to achieve a sufficiently high density or a sufficiently high crystal phase-to-grain boundary phase proportion (in a case, an excessively large grain boundary phase was formed). Therefore, the bending strength or the thermal conductivity thereof was undesirably reduced.

[EXAMPLES 70-73]

Silicon nitride ceramic sintered bodies of Example 70-73 were prepared in generally the same manner as in Example 36, except that the oxides of rare earth elements as shown in Table 10 were used instead of the $Y_2O_3$ powder.

The porosities, thermal conductivities, three-point bending strengths at a room temperature (25° C.) and crystal phase-to-grain boundary phase proportions (by X-ray analysis) of the sintered bodies of Examples 70-73 were determined under the same conditions as in Example 36. The results are shown in Table 10.

TABLE 10

| Sintered Body | Oxide of Rare Earth Element | Porosity (%) | Crystal Phase Ratio (%) | Thermal Conductivity (W/m · K) | 3-Point Bending Strength (kg/mm$^2$) |
|---|---|---|---|---|---|
| Ex. 70 | CeO$_2$ | 0.3 | 48 | 85 | 95 |
| Ex. 71 | Nd$_2$O$_3$ | 0.4 | 47 | 85 | 95 |
| Ex. 72 | Yb$_2$O$_3$ | 0.5 | 55 | 87 | 90 |
| Ex. 73 | Dy$_2$O$_3$ | 0.4 | 50 | 87 | 98 |

As shown in Table 10, the sintered bodies of Examples 70-73 employing rare earth element oxides other than $Y_2O_3$ achieved generally the same properties as those of the sintered bodies employing $Y_2O_3$.

In addition to the above examples, various material mixture powders were prepared by adding 5% by weight of $Y_2O_3$ powder and 1 by weight of at least one compound selected from the group consisting of ZrC, VC, NbC, TaC, $Cr_3C_2$, $Mo_2C$, TiN, ZrN, VN, TaN, CrN, $Mo_2N$, $W_2N$, $TiSi_2$, $ZrSi_2$, $VSi_2$, $NbSi_2$, $TaSi_2$, $CrSi_2$, $MoSi_2$, $WSi_2$, $ZrB_2$, $VB_2$, $NbB_2$, $TaB_2$, $CrB_2$, $MoB_2$ and $WB_2$, to the silicon nitride powder. The material mixture powders were then processed in generally the same manner as in Example 36, thus obtaining various silicon nitride sintered bodies. The porosities, thermal conductivities, three-point bending strengths at a room temperature (25° C.) and crystal phase-to-grain boundary phase proportions (by X-ray analysis) of the silicon nitride sintered bodies were determined under the same conditions as in Example 36. The results were substantially the same as in Examples 36-73.

As described above, according to the present invention, a silicon nitride sintered body is produced by: molding and sintering a fine powder of silicon nitride having predetermined purity and grain size and containing predetermined amounts of a rare earth element and, optionally, aluminum nitride and/or alumina, or a compound of Ti, Zr, Hf, etc.; and cooling the sintered body at a low cooling rate, that is, 100° C. per hour or lower. Unlike the conventional process in which sintered body is cooled rather quickly by, for example, the furnace cooling method, the grain boundary phase of the sintered body is changed from the amorphous state to such a state where a crystal phase is present, according to the present invention. Thus, the silicon nitride sintered body of the present invention achieves high density, high strength and high thermal conductivity. The sintered body of the present invention is suitable for electronic components and parts, such as semiconductor substrates, heat-radiating plates, etc.

What is claimed is:

1. A high thermal conductive silicon nitride sintered body containing: 2.0-7.5% by weight of a rare earth element in terms of an oxide thereof; and at most 0.3% by weight of Li, Na, K, Fe, Ca, Mg, Sr, Ba, Mn and B as impurity cationic elements in terms of total amount thereof, and having a thermal conductivity of at least 60 W/m·K.

2. A high thermal conductive silicon nitride sintered body containing: 2.0-7.5% by weight of a rare earth element in terms of an oxide thereof; at most 2.0% by weight of aluminum compound calculated as alumina; at most 0.3% by weight of Li, Na, K, Fe, Ca, Mg. Sr. Ba, Mn and B as impurity cationic elements in terms of total amount thereof, and comprising a silicon nitride crystal phase and a grain boundary phase.

3. A high thermal conductive silicon nitride sintered body according to claim 2, wherein the ratio of the area of a crystal compound phase formed in said grain boundary phase to the area of said grain boundary phase is at least 20%.

4. A high thermal conductive silicon nitride sintered body according to claim 2, having a porosity of at most 1.5% by volume, a thermal conductivity of at least 60 W/m·K, and a three-point bending strength of at least 80 kg/mm$^2$ at a room temperature.

5. A high thermal conductive silicon nitride sintered body containing: 2.0-7.5% by weight of a rare earth element in terms of an oxide thereof; at most 2.0% by weight of aluminum nitride; at most 0.3% by weight of Li, Na, K, Fe, Ca, Mg, Sr, Ba, Mn and B as impurity cationic elements in terms of total amount thereof, and comprising a silicon nitride crystal phase and a grain boundary phase.

6. A high thermal conductive silicon nitride sinter according to claim 5, wherein the ratio of the area of a crystal compound phase formed in said grain boundary phase to the area of said grain boundary phase is at least 20%.

7. A high thermal conductive silicon nitride sintered body according to claim 5, having a porosity of at most 1.5% by volume, a thermal conductivity of at least 60 W/m·K, and a three-point bending strength of at least 80 kg/mm$^2$ at a room temperature.

8. A high thermal conductive silicon nitride sintered body containing: 2.0-7.5% by weight of a rare earth element in terms of an oxide thereof; at most 2.0% by weight of aluminum compound calculated as alumina, aluminum nitride or mixtures thereof; at most 0.3% by weight of Li, Na K, Fe, Ca, Mg, Sr, Ba, Mn and B as impurity cationic elements in terms of total amount thereof, and comprising a silicon nitride crystal phase and a grain boundary phase.

9. A high thermal conductive silicon nitride sintered body according to claim 8, wherein the ratio of the area of a crystal compound phase formed in said grain boundary phase to the area of said grain boundary phase is at least 20%.

10. A high thermal conductive silicon nitride sintered body according to claim 8, having a porosity of at most 1.5% by volume, a thermal conductivity of at least 60 W/m·K, and a three-point bending strength of at least 80 kg/mm$^2$ at a room temperature.

11. A high thermal conductive silicon nitride sintered body containing: 2.0-7.5% by weight of a rare earth element in terms of an oxide thereof; 0.2-3.0% by weight of at least one compound selected from the group consisting of the oxides, carbides, nitrides, silicides and borides of Ti, Zr, Hf, V, Nb, Ta, Cr, Mo and W; at most 0.3% by weight of Li, Na, K, Fe, Ca, Mg, Sr, Ba, Mn and B as impurity cationic elements in terms of total amount thereof, and comprising a silicon nitride crystal phase and a grain boundary phase.

12. A high thermo-conductive silicon nitride sintered body according to claim 11, wherein the ratio of the area of a crystal compound phase formed in said grain boundary phase to the area of said grain boundary phase is at least 20%.

13. A high thermal conductive silicon nitride sintered body according to claim 11, having a porosity of at most 1.5% by volume, a thermal conductivity of at least 60 W/m·K, and a three-point bending strength of at least 80 kg/mm² at a room temperature.

14. A high thermal conductive silicon nitride sintered body containing: 2.0–7.5% by weight of a rare earth element in terms of an oxide thereof; 0.2–30% by weight of at least one compound selected from the group consisting of the oxides, carbides, nitrides, silicides and borides of Ti, Zr, Hf, V, Nb, Ta, Cr, Mo and W; at most 2.0% by weight of aluminum compound calculated as alumina, aluminum nitride or mixtures thereof; at most 0.3% by weight of Li, Na, K, Fe, Ca, Mg, Sr, Ba, Mn and B as impurity cationic elements in terms of total amount thereof, and comprising a silicon nitride crystal phase and a grain boundary phase.

15. A high thermal conductive silicon nitride sintered body according to claim 14, wherein the ratio of the area of a crystal compound phase formed in said grain boundary phase to the area of said grain boundary phase is at least 20%.

16. A high thermal conductive silicon nitride sintered body according to claim 14, having a porosity of at most 1.5% by volume, a thermal conductivity of at least 60 W/m·K, and a three-point bending strength of at least 80 kg/mm² at a room temperature.

17. A method of producing a high thermal conductive silicon sintered body, comprising the steps of:
forming a compact by molding a mixture obtained by adding 2.0–7.5% by weight of a rare earth element in terms of the amount of an oxide thereof, and at most 2.0% by weight of alumina, aluminum nitride or mixtures thereof, to a silicon nitride powder which contains at most 1.7% by weight of oxygen, at most 0.3% by weight of Li, Na, K, Fe, Ca, Mg, Sr, Ba, Mn and B as impurity cationic elements in terms of total amount thereof, and at least 90% by weight of alpha-phase type silicon nitride, and which has an average grain size of at most 0.8 μm;
degreasing said compact;
sintering said compact at a temperature of 1800°–2000° C. while pressurizing the atmosphere around said compact to form a sintered body; and
cooling the sintered body at a cooling rate of at most 100° C. per hour until the temperature is reduced to a point at which a liquid phase formed of said rare earth element during the sintering step solidifies.

18. A method of producing a high thermal conductive silicon nitride sintered body, comprising the steps of:
forming a compact by molding a mixture obtained by adding 2.0–7.5% by weight of a rare earth element in terms of the amount of an oxide thereof, and 0.2–3.0% by weight of at least one compound selected from the group consisting of the oxides, carbides, nitrides, silicides and borides of Ti, Zr, Hf, V, Nb, Ta, Cr, Mo and W, to a silicon nitride powder which contains at most 1.7% by weight of oxygen, at most 0.3% by weight of Li, Na, K, Fe, Ca, Mg, Sr, Ba, Mn and B as impurity cationic elements in terms of total amount thereof, and at least 90% by weight of alpha-phase type silicon nitride, and which has an average grain size of at most 0.8 μm;
degreasing said compact;
sintering said compact at a temperature of 1800°–2000° C. while pressurizing the atmosphere around said molding to form a sintered body; and
cooling the sintered body at a cooling rate of at most 100° C. per hour until the temperature is reduced to a point at which a liquid phase formed of said rare earth element during the sintering step solidifies.

19. A method of producing a high thermal conductive silicon nitride sintered body, comprising the steps of:
forming a compact by molding a mixture obtained by adding 2.0–7.5% by weight of a rare earth element in terms of the amount of an oxide thereof, 0.2–3.0% by weight of at least one compound selected from the group consisting of the oxides, carbides, nitrides, silicides and borides, of Ti, Zr, Hf, V, Nb, Ta, Cr, Mo and W, and 0.1–2.0% by weight of alumina, aluminum nitride or mixtures thereof to a silicon nitride powder which contains at most 1.7% by weight of oxygen, at most 0.3% by weight of Li, Na, K, Fe, Ca, Mg, Sr. Ba, Mn and B as impurity cationic elements in terms of total amount thereof, and at least 90% by weight of alpha-phase type silicon nitride, and which has an average grain size of at most 0.8 μm;
degreasing said compact;
sintering said compact at a temperature of 1800°2000° C. while pressurizing the atmosphere around said compact to form a sintered body; and
cooling the sintered body at a cooling rate of at most 100° C. per hour until the temperature is reduced to a point at which a liquid phase formed of said rare earth element during the sintering step solidifies.

20. The high thermal conductive silicon nitride sintered body produced by the method of claim 17.

21. The high thermal conductive silicon nitride sintered body produced by the method of claim 18.

22. The high thermal conductive silicon nitride sintered body produced by the method of claim 19.

* * * * *